US011455225B2

(12) United States Patent
Furlong et al.

(10) Patent No.: US 11,455,225 B2
(45) Date of Patent: Sep. 27, 2022

(54) ELECTRONIC DEVICE HAVING INFRARED LIGHT-EMITTING DIODE FOR DATA TRANSMISSION

(71) Applicant: Western Digital Technologies, Inc., San Jose, CA (US)

(72) Inventors: Jeff Furlong, Irvine, CA (US); Dean M. Jenkins, La Canada, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/173,017

(22) Filed: Feb. 10, 2021

(65) Prior Publication Data

US 2022/0043729 A1 Feb. 10, 2022

Related U.S. Application Data

(60) Provisional application No. 63/060,959, filed on Aug. 4, 2020.

(51) Int. Cl.
*H04B 10/50* (2013.01)
*G06F 11/30* (2006.01)
*H04B 10/66* (2013.01)

(52) U.S. Cl.
CPC ....... *G06F 11/3055* (2013.01); *H04B 10/502* (2013.01); *H04B 10/66* (2013.01)

(58) Field of Classification Search
None
See application file for complete search history.

(56) References Cited

U.S. PATENT DOCUMENTS

| 4,829,166 | A | * | 5/1989 | Froelich | G06K 7/10336 902/4 |
| 5,196,682 | A | * | 3/1993 | Englehardt | G01D 9/005 235/491 |
| 5,218,466 | A | * | 6/1993 | Brooks | H04B 10/11 398/116 |
| 5,247,380 | A | | 9/1993 | Lee et al. | |

(Continued)

FOREIGN PATENT DOCUMENTS

| EP | 2675084 A1 | 12/2013 | |
| GB | 2185134 A * | 7/1987 | ......... G06K 19/0723 |

(Continued)

OTHER PUBLICATIONS

Atmel, AVR415: RC5 IR Remote Control Transmitter on tiny AVR and megaAVR, 2016 (Year: 2016).*

(Continued)

*Primary Examiner* — Jai M Lee
(74) *Attorney, Agent, or Firm* — John D. Henkhaus

(57) ABSTRACT

An electronic device may be provisioned with an infrared (IR) light-emitting diode (LED) configured to externally transmit identifying information that particularly identifies the device, such as the device serial number, to outside of the device. A companion portable IR LED reader may be used to systematically scan a row or shelf or rack of electronic devices to read the respective communication signals transmitted from each of the respective devices, thereby enabling quick and accurate physical identification of the devices in a system/datacenter and inhibiting the unnecessary removal of an incorrect or misidentified device for replacement.

20 Claims, 4 Drawing Sheets

(56) References Cited

U.S. PATENT DOCUMENTS

| | | | | |
|---|---|---|---|---|
| 5,343,319 | A * | 8/1994 | Moore | H04B 10/00 455/343.1 |
| 5,600,471 | A * | 2/1997 | Hirohashi | H04B 10/11 370/491 |
| 5,602,668 | A * | 2/1997 | Kuchta | H04B 10/116 398/201 |
| 5,633,742 | A * | 5/1997 | Shipley | G08B 13/2462 398/118 |
| 5,726,786 | A * | 3/1998 | Heflinger | H04B 10/1149 398/121 |
| 5,774,637 | A * | 6/1998 | Haber | G06F 3/1204 358/1.15 |
| 5,838,472 | A * | 11/1998 | Welch | H04B 10/40 398/127 |
| 5,850,189 | A * | 12/1998 | Sakanaka | H04B 10/1143 455/352 |
| 5,861,969 | A * | 1/1999 | Yasuda | H04B 10/1143 398/115 |
| 6,128,117 | A * | 10/2000 | Kim | H04B 10/801 398/115 |
| 6,211,797 | B1 * | 4/2001 | Kimura | H04B 10/11 340/3.1 |
| 6,256,129 | B1 * | 7/2001 | Kim | H04B 10/1143 398/9 |
| 6,298,047 | B1 * | 10/2001 | Steffes | H04W 74/04 370/310 |
| 6,337,856 | B1 * | 1/2002 | Schanhals | H04L 12/6418 370/352 |
| 6,480,313 | B1 * | 11/2002 | Kawamura | H04B 10/1149 398/173 |
| 6,693,879 | B1 * | 2/2004 | Kawamura | H04B 10/1149 370/235 |
| 7,058,308 | B2 * | 6/2006 | Tsai | H04B 10/1141 398/131 |
| 7,630,645 | B2 * | 12/2009 | Hong | H04B 10/1149 398/107 |
| 8,135,282 | B2 * | 3/2012 | Hosking | H04B 10/40 398/135 |
| 8,947,816 | B1 * | 2/2015 | Ryan | G06F 3/0658 711/114 |
| 9,622,030 | B1 | 4/2017 | Amir et al. | |
| 2002/0129186 | A1 | 9/2002 | Emerson et al. | |
| 2004/0071471 | A1 * | 4/2004 | Baker | H04B 10/1143 398/140 |
| 2004/0094696 | A1 * | 5/2004 | Ramirez-Iniguez | G02B 5/288 250/216 |
| 2004/0161246 | A1 * | 8/2004 | Matsushita | G06F 3/0481 398/187 |
| 2004/0203317 | A1 | 10/2004 | Small | |
| 2005/0258232 | A1 * | 11/2005 | Kitamura | G06K 17/00 701/1 |
| 2007/0092257 | A1 * | 4/2007 | Smith | H04B 10/801 398/135 |
| 2008/0052698 | A1 * | 2/2008 | Olson | G06F 9/44536 717/168 |
| 2012/0025949 | A1 * | 2/2012 | Reed | H04B 10/1149 375/259 |
| 2015/0125154 | A1 | 5/2015 | Chun | |
| 2016/0196194 | A1 * | 7/2016 | Shih | G06F 11/3027 714/43 |
| 2018/0138975 | A1 * | 5/2018 | Brown | H04B 10/50 |
| 2019/0310958 | A1 * | 10/2019 | Pinto | G06F 13/4282 |
| 2020/0267221 | A1 * | 8/2020 | Yuan | G16Y 40/30 |
| 2022/0114884 | A1 * | 4/2022 | Knapp | H04L 12/282 |

FOREIGN PATENT DOCUMENTS

| | | |
|---|---|---|
| WO | WO2012044159 A2 | 4/2012 |
| WO | WO2017093559 A1 | 6/2017 |

OTHER PUBLICATIONS

Dell, Dell Enterprise HDD: What is the meaning of LED on Physical Drives (PD)?, dell.com/support, Article ID SLN305722, Last Modified Sep. 14, 2019, 2 pages, downloaded from https://www.dell.com/support/article/en-in/sln305722/dell-enterprise-hdd-what-is-the-meaning-of-led-on-physical-drives-pd?lang=en.

Suse, 12 Storage Enclosure LED Utilities for MD Software RAIDs, SUSE Linux Enterprise Server Documentation, 8 pages, downloaded on May 4, 2020 from https://documentation.suse.com/sles/15-SP1/html/SLES-all/cha-raid-leds.html.

Netapp, Identify disks by turning on their LEDs, ONTAP 9 Documentation Center, 1 page, downloaded on May 4, 2020 from https://docs.netapp.com/ontap-9/index.jsp?topic=%2Fcom.netapp.doc.dot-cm-cmpr-960%2Fstorage_disk_set-led.html.

Mohammed Zafar Faraz et al., LI-FI Based Data Storage Device, International Journal of Computer Science Trends and Technology (IJCST), Jul.-Aug. 2016, vol. 4 Issue 4, pp. 261-265, www.ijcstjournal.org.

Korean Intellectual Property Office (ISA/KR), PCT International Search Report and Written Opinion for counterpart International application No. PCT/US2021/037516, dated Nov. 2, 2021, 10 pages.

* cited by examiner

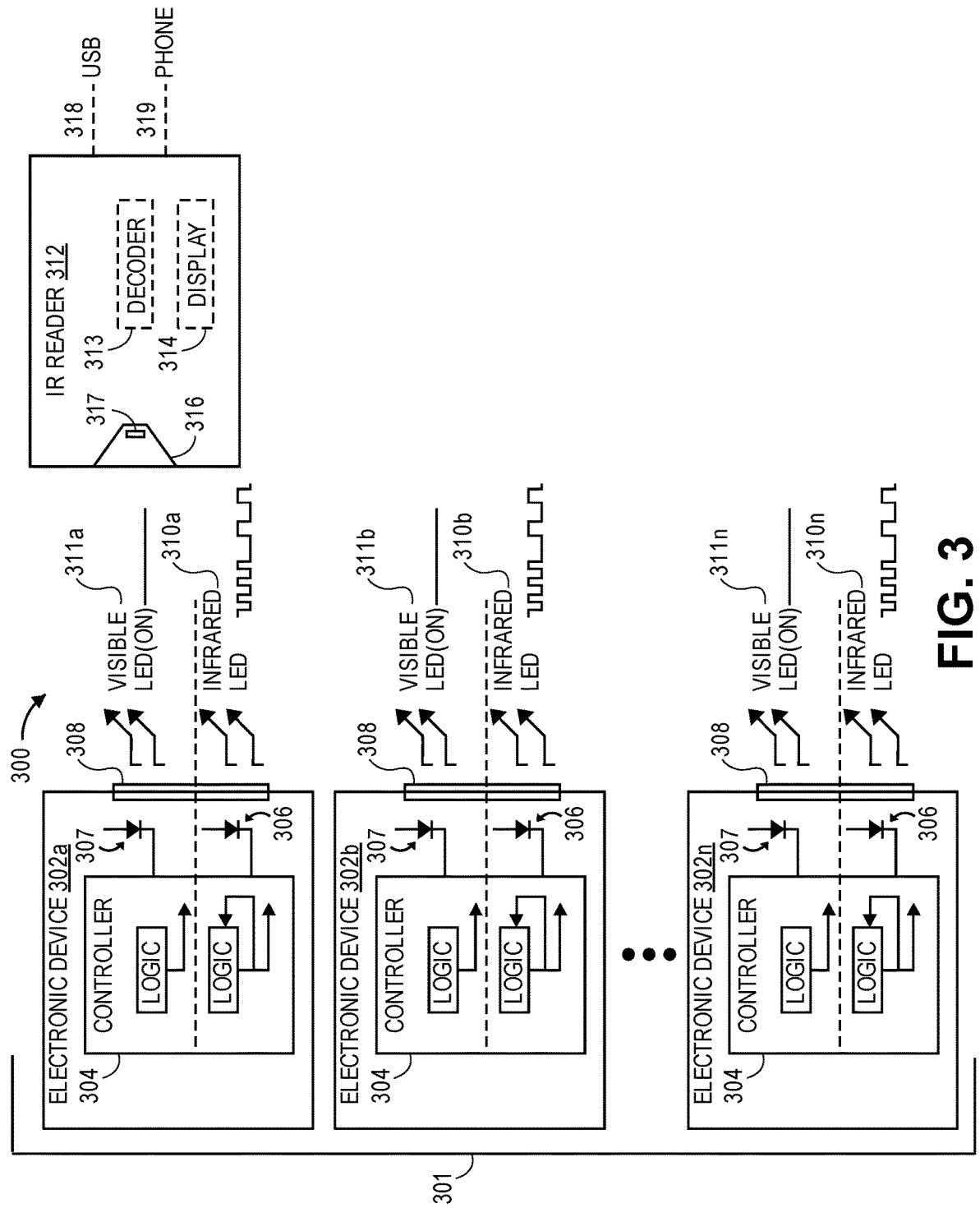

ELECTRONIC DEVICE HAVING INFRARED LIGHT-EMITTING DIODE FOR DATA TRANSMISSION

FIELD OF EMBODIMENT

Embodiments of the invention may relate generally to electronic devices, and particularly to an infrared (IR) light-emitting diode (LED) for transmitting data from an electronic device.

BACKGROUND

Enterprise solid-state storage devices, or solid-state drives (SSDs), have associated industry standard form factors and corresponding specifications and protocols (e.g., the U.2 [SFF-8201+PCIe_SFF-8639_R3.0_V1.0] and U.3 [SFF-8201+SFF-TA-1001] interface standards, and EDSFF 3" [SFF-TA-1008], E1.S (SFF-TA-1006], and E1.L [SFF-TA-1007] form factors), including definitions for pins/signals for and placements of visible LED communication. However, it may be that the utility of current drive LEDs is considered having relatively low customer value. For example, current drive LEDs typically only characterize various statuses of the device, such as power on, activity, optional beaconing (e.g., SOS/attention), and the like.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3 is a block diagram illustrating a communication system, according to an embodiment.

DETAILED DESCRIPTION

Figure 1A:
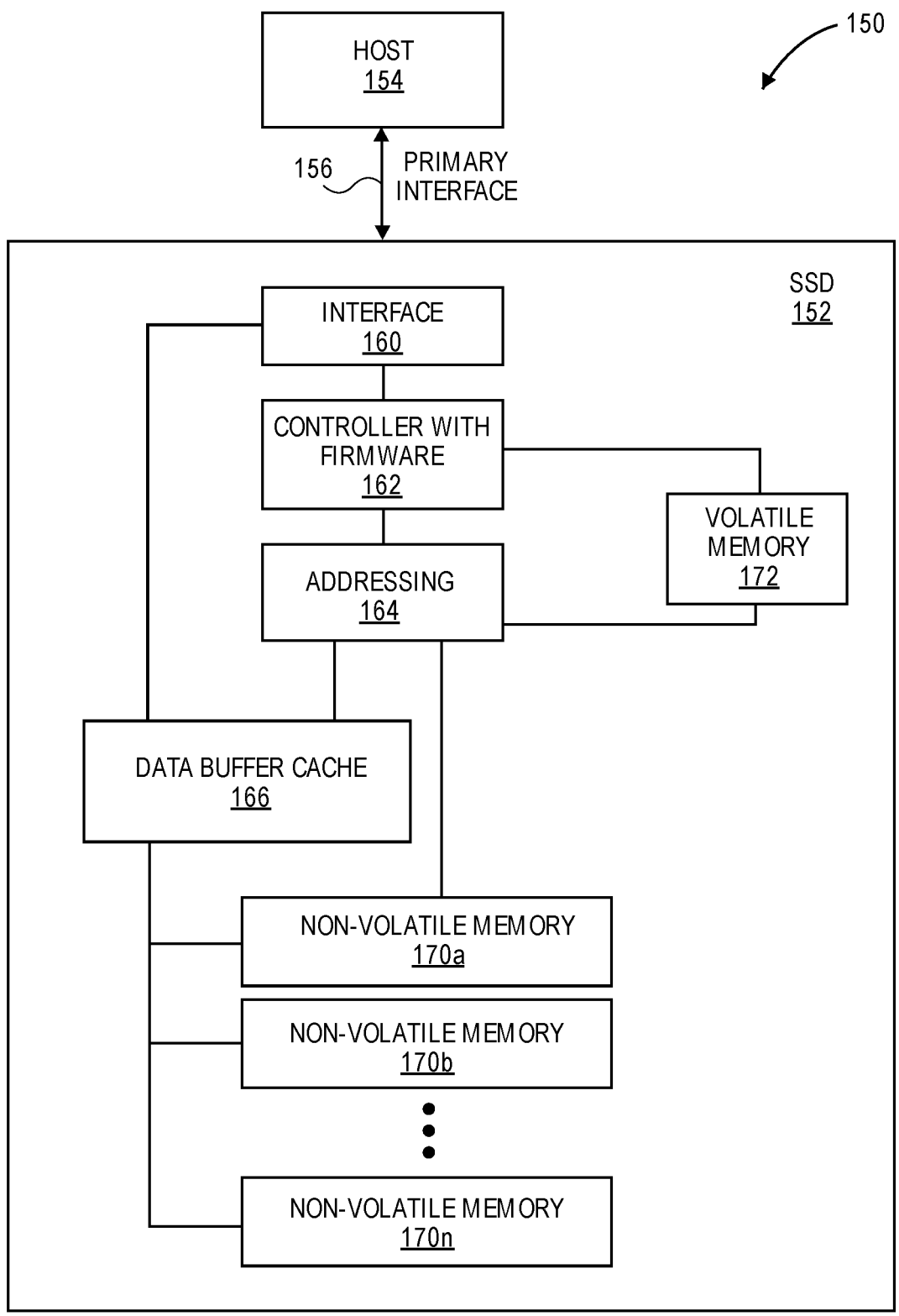
FIG. 1A is a block diagram illustrating a solid-state drive (SSD), according to an embodiment.

Generally, approaches to employing infrared (IR) light-emitting diodes (LEDs) for transmitting data from an electronic device, such as in the context of data storage devices (generally, "drives") in a data storage system, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instance of such phrases do not necessarily all refer to the same embodiment, The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Recall that the utility of current drive LEDs may be considered of relatively low value to customers and end users. Furthermore, many datacenter operators are unable to locate or are significantly challenged by locating faulty drives needing replacement in a data storage system, server farm, communications network, and the like. This can lead to mistakenly removing non-faulty drives, which could potentially result in data loss, degradation of performance, and other undesirable impacts. At least part of this problem arises from drive labels and unique drive serial numbers being visible only after a drive is removed from its chassis or carrier. Thus, a manner in which to externally convey important drive information outside of the drive may be beneficial.

Infrared (IR) Light-Emitting Diode (LED) for External Transmission of Data in-Drive IR LED In light of the foregoing challenges with "in-situ" drive identification (e.g., while housed in an equipment rack), an infrared LED may be implemented, such as to augment a conventional "Power ON" LED. That is, according to an embodiment an existing Power ON LED is maintained in a drive, while a new IR LED is added adjacent to or otherwise near the Power ON LED. This IR LED can be used to communicate drive identifying information, drive health information, and/or simple metadata, for example and according to an embodiment, and can readily communicate at around 9600 bits per second (bps). Each LED may be configured for control by different LED control routines, such as a static state routine to command the Power ON LED to emit visible light indicating the drive power is on, and a dynamic state routine to command the IR LED to communicate by transmitting data bytes over a repeating loop so that some data field(s) may change over time as dynamic information updates, as described in more detail elsewhere herein.

Figure 2:
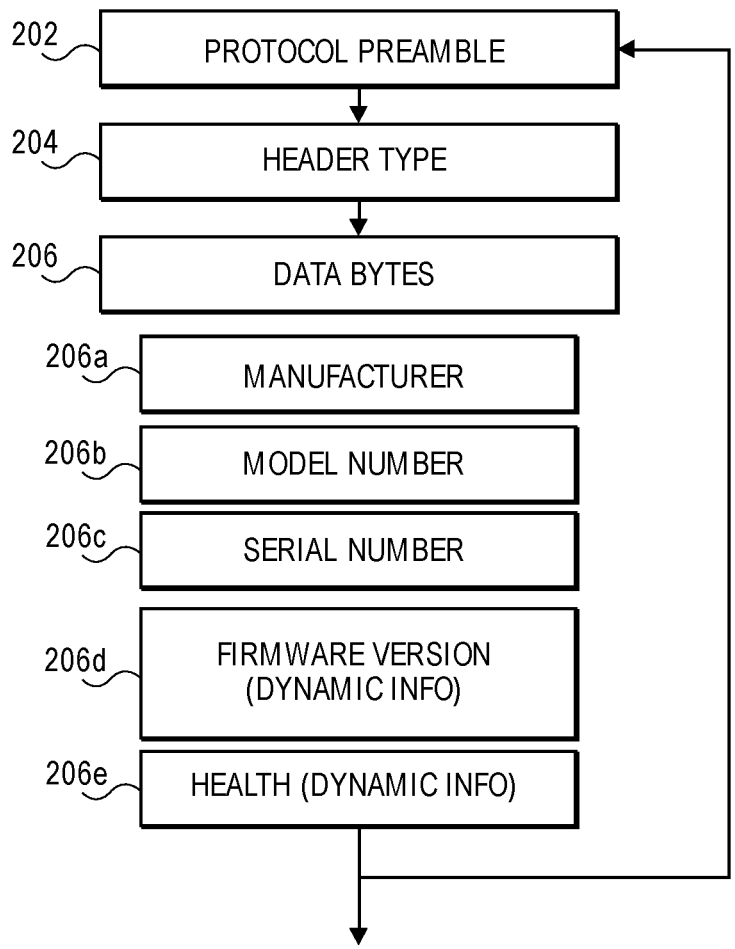
FIG. 2 is a block diagram illustrating an infrared (IR) light-emitting diode (LED) communication protocol, according to an embodiment.

FIG. 2 is a block diagram illustrating an infrared (IR) light-emitting diode (LED) communication protocol, according to an embodiment. According to an embodiment, data or information transmitted by the IR LED is according to a protocol comprising a protocol preamble 202, a header type 204, and data bytes 206 (or "payload"), all of which may be superimposed upon a carrier wave (e.g., a pulse wave packet) emitted from the IR LED. The protocol preamble 202 field is for use in denoting the communication protocol(s) being used for the IR communication, such as RS-232 ("Recommended Standard 232", a standard for serial communication transmission of data), RC5 encryption algorithm ("Rivest cipher 5", a symmetric-key block cipher), and the like, for non-limiting examples. The header type 204 field is for use in denoting the length of expected data and field definitions (until the next protocol preamble 202), and which may be established as a standard for one or more types of electronic devices or may be vendor unique, for example.

The data bytes 206 field is for use in denoting fields of data representing various types and/or forms of information being communicated and conveyed from the IR LED, may be an encrypted header type (e.g., fixed length ciphertext), and whose header type(s) may be established as a standard for one or more types of electronic devices or may be vendor unique, for example. According to embodiments, the data bytes 206 field may contain payload, which may be encrypted as denoted in the preamble or header type, comprising one or more of the following static device identifying information that particularly identifies a given electronic device such as a data storage device: (a) the device manufacturer 206a, (b) the device model number 206b, and (c) the device serial number 206c, e.g., identifying information that is typically included on a device label attached to a given device. According to embodiments, the data bytes 206 field may further contain payload comprising one or more of the following dynamic device information about a given electronic device: (d) the device firmware version 206d, and (e) the device health 206e information.

FIG. 3 is a block diagram illustrating a communication system, according to an embodiment. Communication system 300 comprises a plurality of electronic devices 302a, 302b-302n (collectively electronic devices 302a-302n), where n represents an arbitrary number of devices (e.g. data storage devices such as hard disk drives (HDDs) and/or solid-state drives (SSDs) in a datacenter 301) that may vary from implementation to implementation. The type of device represented by one or more of the electronic devices 302a-302n may include, for example and according to an embodiment, a data storage device, a server device, a network switch, and a power distribution unit. Each device 302a-302n comprises and is at least in part under the control of one or more controller 304 circuitry (e.g., an application specific integrated circuit, or ASIC) comprising and/or embodying one or more sequences of instructions (i.e., logic) which when executed by one or more processors are enabled to carry out corresponding steps, operations, routines, procedures, and the like.

According to an embodiment, each device 302a-302n further comprises a visible LED 307, such as a Power ON LED configured to emit a corresponding visible steady-state signal 311a-311n, and an infrared (IR) light-emitting diode (LED) 306 configured to externally transmit (i.e., to outside of the device) and communicate identifying information, from the source or manufacturer of the device, that particularly identifies the device (see, e.g., data bytes 206 of FIG. 2), such as via a corresponding infrared carrier wave signal 310a-310n carrying a payload comprising such respective identifying information. Infrared radiation as commonly known is generally invisible (to the human eye) radiation or light with frequencies lying between visible light and microwave (e.g., generally understood as, at wavelengths between around 700 nanometers to 1 millimeter). Each of the visible LED 307 and the IR LED 306 may be implemented to operate under the control of separate controller 304 logic routines. For example, the routine associated with the visible LED 307 may operationally control the LED 307 in a static or steady state (e.g., light on means device power is on, light off means device power is off), and the routine associated with the IR LED 306 may operationally control the IR LED 308 according to a repeating loop as depicted in FIG. 2, so that any dynamic information (see, e.g., firmware version 206d and health 206e of FIG. 2) being communicated by IR LED 306 can be updated and transmitted accordingly.

Each of the visible LED 307 and the IR LED 306 may be implemented closely positioned to each other, e.g., adjacent, on the same circuit board. According to an embodiment, each device 302a-302n may further comprise a light pipe 308 optically coupled to the visible LED 307 for transmission of the corresponding visible light signal 311a-311n from the LED 307 to outside of each respective device 302a-302n, and where the IR LED 306 is further optically coupled to the same light pipe 308 for transmission of the corresponding encoded data bytes 206 payload (FIG. 2) of the corresponding IR carrier signal 310a-310n from the IR LED 306 to outside of each device 302a-302n. That is, the visible LED 307 and the IR LED 306 outputs may be merged to one common light pipe 308 to transmit both to the exterior of the respective device 302a-302n, as the different frequencies of light allow both outputs to travel through one shared channel. Reference is made to relevant standards, such as U.2, U.3, EDSFF 3", E1.S, E1.L, the entire content of each of which is incorporated by reference for all purposes as if fully set forth herein, for guidance regarding the appropriate placement of the IR LED 306 within a device 302a-302n and for the need for or implementation of a light pipe 308.

In the context of a system in which such electronic devices provisioned with the IR LED 306 as described are implemented, such as a storage system, storage network, server farm, and the like, a system vendor may decide to use a light pipe to assist in transmitting the information to outside of or to the perimeter of the system. For example, enterprise solid-state drives (SSDs) conforming to the U.2 or U.3 interface standards, which define the pins/signals for visible LED communication, may want or need to employ a light pipe external to the electronic device and communicatively coupled with the IR LED 306. Hence, SSD suppliers may want or need to place the IR LED 306 and the visible LED 307 at or on a certain position within the device to facilitate connection with such an external system light pipe.

IR LED Reader

With continuing reference to FIG. 3, communication system 300 further comprises a portable IR reader 312 comprising a light funnel 316 configured to avoid interference from neighboring devices installed in the same system. Thus, a single IR reader 312 unit may be employed to systematically scan a row or shelf or rack of electronic devices to "read" the respective communication signals 310a-310n transmitted from each of the respective devices 302a-302n. According to an embodiment, the light funnel 316 leads to a recessed IR sensor 317, collectively configured with the light funnel 316 to narrow the receiving field of the sensor, i.e., the sensor field. Thus, the IR reader 312 is configured to receive the signals 310a-310n via the light funnel 316 and recessed IR sensor 317 and, according to an embodiment, further configured to decode the signals 310a-310n via an on-board decoder 313 or processor, for display on an on-board display 314. As configured as such a self-contained device, the IR reader 312 is considered a handheld device. However, the IR reader 312 may alternatively be configured to be a "dumb" device lacking the decoder 313 and/or display 314, whereby the IR reader 312 is configured to pass through each sensed IR signal 310a-310n received from a corresponding device 302a-302n to an external processing device, for example, to a USB (Universal Serial Bus)-connected device, such as a laptop computer, via a USB communication link 318 and/or to a smart phone (on which a suitable application or "app" is installed) or tablet or the like via a suitable communication link depicted as phone communication link 319.

With respect to an implementation of the foregoing approaches, relatively quick and accurate physical identification of the electronic devices in a system/datacenter is enabled. Furthermore, removal of an incorrect device for replacement is thereby inhibited, thereby leading to increased data availability/uptime. Moreover, such capabilities may be provided with a small cost increase to the device bill of materials, i.e., relatively inexpensively, such as at the expense of another LED and a more versatile light pipe to handle both the visible and the IR light.

Solid State Drive Configuration

As discussed, embodiments may be used in the context of a data storage system or datacenter in which multiple data storage devices (DSDs) such as SSDs are employed. Thus, FIG. 1A is a block diagram illustrating an example operating context of such an electronic device with which embodiments of the invention may be implemented. FIG. 1A illustrates a generic SSD architecture 150, with an SSD 152 communicatively coupled with a host 154 through a primary communication interface 156. Embodiments are not limited to a configuration as depicted in FIG. 1A, rather, embodiments may be implemented with SSD configurations other than that illustrated in FIG. 1A. For example, embodiments may be implemented to operate in other environments that rely on non-volatile memory storage components for writing and reading of data.

Host 154 broadly represents any type of computing hardware, software, or firmware (or any combination of the foregoing) that makes, among others, data I/O requests or calls to one or more memory device. For example, host 154 may be an operating system executing on a computer, a tablet, a mobile phone, or generally any type of computing device that contains or interacts with storage memory. The primary interface 156 coupling host 154 to SSD 152 may be, for example, a storage system's internal bus or a communication cable or a wireless communication link, or the like.

The example SSD 152 illustrated in FIG. 1A includes an interface 160, a controller 162 (e.g., a controller having firmware logic therein), an addressing 164 function block, data buffer cache 166, and one or more non-volatile memory (NVM) components 170a, 170b-170n, where n represents an arbitrary number of NVM components that may vary from implementation to implementation.

Interface 160 is a point of interaction between components, namely SSD 152 and host 154 in this context, and is applicable at the level of both hardware and software. This allows a component to communicate with other components via an input/output (IO) system and an associated protocol. A hardware interface is typically described by the mechanical, electrical and logical signals at the interface and the protocol for sequencing them. Some non-limiting examples of common and standard interfaces include SCSI (Small Computer System Interface), SAS (Serial Attached SCSI), and SATA (Serial ATA).

An SSD 152 includes a controller 162, which incorporates the electronics that bridge the non-volatile memory components (e.g., NAND flash) to the host, such as non-volatile memory 170a, 170b-170n to host 154. The controller is typically an embedded processor that executes firmware-level code and can be a significant factor in SSD performance.

Controller 162 interfaces with non-volatile memory 170a, 170b-170n via an addressing 164 function block. The addressing 164 function operates, for example, to manage mappings between logical block addresses (LBAs) from the host 154 to a corresponding physical block address on the SSD 152, namely, on the non-volatile memory 170a, 170b-170n of SSD 152. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 172, such as DRAM or some other local volatile memory component accessible to controller 162 and addressing 164. Alternatively, the table structure may be maintained more persistently across sessions in the SSD's non-volatile memory such as non-volatile memory 170a, 170b-170n.

Addressing 164 interacts with data buffer cache 166, in addition to non-volatile memory 170a, 170b-170n. Data buffer cache 166 of an SSD 152 typically uses DRAM as a cache, similar to the cache in hard disk drives. Data buffer cache 166 serves as a buffer or staging area for the transmission of data to and from the non-volatile memory components, as well as serves as a cache for speeding up future requests for the cached data. Data buffer cache 166 is typically implemented with volatile memory so the data stored therein is not permanently stored in the cache, i.e., the data is not persistent.

Finally, SSD 152 includes the one or more non-volatile memory 170a, 170b-170n components. For a non-limiting example, the non-volatile memory components 170a, 170b-170n may be implemented as flash memory (e.g., NAND or NOR flash), or other types of solid-state memory available now or in the future. The non-volatile memory 170a, 170b-170n components are the actual memory electronic components on which data is persistently stored. The non-volatile memory 170a, 170b-170n components of SSD 152 can be considered the analogue to the hard disks in hard-disk drive (HDD) storage devices.

Furthermore, references herein to a data storage device may encompass a multi-medium storage device (or "multi-medium device", which may at times be referred to as a "multi-tier device" or "hybrid drive"). A multi-medium storage device refers generally to a storage device having functionality of both a traditional HDD (see, e.g., HDD 100) combined with an SSD (see, e.g., SSD 150) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A multi-medium storage device may be architected and configured to operate and to utilize the solid-state portion in a number of ways, such as, for non-limiting examples, by using the solid-state memory as cache memory, for storing frequently-accessed data, for storing I/O intensive data, for storing metadata corresponding to payload data (e.g., for assisting with decoding the payload data), and the like. Further, a multi-medium storage device may be architected and configured essentially as two storage devices in a single enclosure, i.e., a traditional HDD and an SSD, with either one or multiple interfaces for host connection.

Hard Disk Drive Configuration

Embodiments may also be used in the context of hard disk drives (HDDs), such as external HDDs in which cases/enclosures are used to enclose or house an HDD, and with which IR LEDs as illustrated and described herein may be implemented. Thus, in accordance with an embodiment, a plan view illustrating an HDD 100 is shown in FIG. 1B to illustrate exemplary operating components of such an electronic device with which embodiments of the invention may be implemented.

Figure 1B:
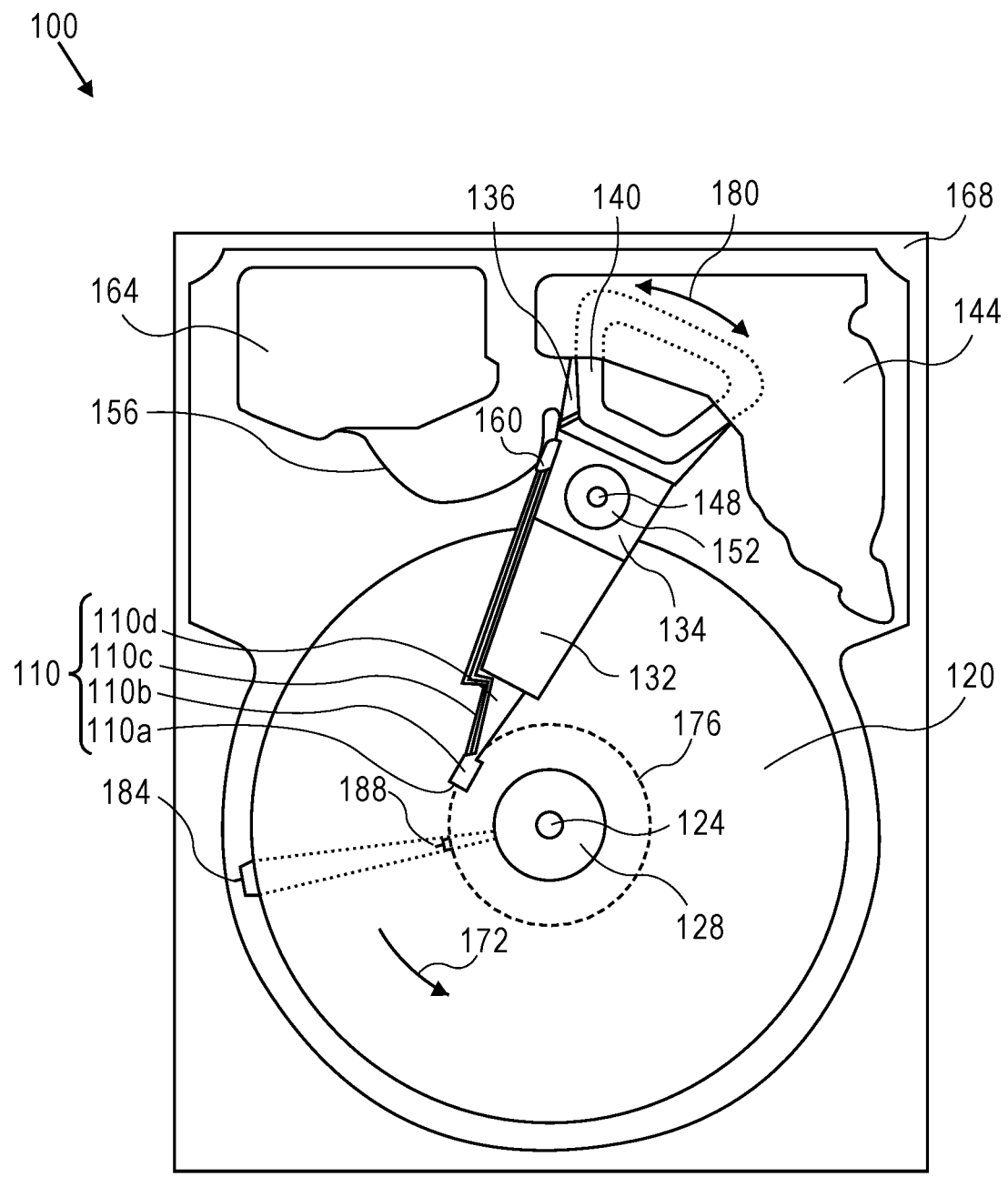
FIG. 1B is a plan view illustrating a hard disk drive (HDD), according to an embodiment.

FIG. 1B illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1B, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1B, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage system comprising:
 a plurality of data storage drives in the form of hard disk drives and/or solid-state drives and/or hybrid drives, each data storage drive comprising:
  an infrared (IR) light-emitting diode (LED) configured to externally transmit identifying information established by the data storage drive manufacturer to particularly identify the data storage drive.

2. The data storage system of claim 1, wherein the IR LED is configured to transmit the identifying information to an IR receiver outside the data storage drive.

3. The data storage system of claim 1, wherein the identifying information includes a serial number of the data storage drive.

4. The data storage system of claim 1, wherein the identifying information includes one or more of a manufacturer and a model number corresponding to the data storage drive.

5. The data storage system of claim 1, wherein the IR LED is further configured to externally transmit health information characterizing the health of the data storage drive.

6. The data storage system of claim 1, wherein the IR LED is further configured to externally transmit a firmware identifier identifying a firmware version of the data storage drive.

7. The data storage system of claim 1, wherein the IR LED is further configured to externally transmit, according to a corresponding communication protocol, (i) a protocol preamble, (ii) a header type, and (iii) a payload identifying: (a) a manufacturer of the data storage drive, (b) a model number corresponding to the data storage drive, (c) a serial number of the data storage drive, (d) health information characterizing the health of the data storage drive, and (e) a firmware identifier identifying a firmware version of the data storage drive.

8. The data storage system of claim 1, each data storage drive further comprising:
 a power on LED; and
 a light pipe optically coupled to the power on LED for transmission of visible light from the power on LED to outside of the data storage drive;
 wherein the IR LED is optically coupled to the light pipe for transmission of the information from the IR LED to outside of the data storage drive.

9. The data storage system of claim 8, each data storage drive further comprising:
 a controller circuitry configured to control, according to a repeating loop, a signal carrying the information from the IR LED.

10. The data storage system of claim 1, wherein the IR LED is further configured to externally transmit the identifying information according to a communication protocol from a group consisting of Recommended Standard 232 (RS-232) and Rivest cipher 5 (RC5 encryption algorithm).

11. A communication system comprising:
 a plurality of data storage drives in the form of hard disk drives and/or solid-state drives and/or hybrid drives, each data storage drive comprising:
  an infrared (IR) light-emitting diode (LED) configured to transmit to outside of the data storage drive a carrier wave signal carrying a payload comprising identifying information from the manufacturer that particularly identifies the data storage drive; and
 a portable IR receiver comprising:
  a light funnel configured to avoid interference from neighboring data storage drives.

12. The communication system of claim 11, wherein the light funnel leads to a recessed sensor configured to narrow a field of the sensor.

13. The communication system of claim 11, wherein the IR receiver is a handheld device comprising a display.

14. The communication system of claim 11, constituent to a datacenter.

15. The communication system of claim 11, wherein the identifying information includes a serial number particularly identifying the data storage drive.

16. The communication system of claim 11, wherein the IR LED is further configured to transmit to outside of the data storage drive a carrier wave signal carrying, according to a corresponding communication protocol, (i) a protocol preamble, (ii) a header type, and (iii) a payload identifying: (a) a manufacturer of the data storage drive, (b) a model number corresponding to the data storage drive, (c) a serial number of the data storage drive, (d) health information characterizing the health of the data storage drive, and (e) a firmware identifier identifying a firmware version of the data storage drive.

17. The communication system of claim 11, wherein each data storage drive further comprises:
   a power on LED; and
   a light pipe optically coupled to the power on LED for transmission of visible light at a first frequency from the power on LED;
   wherein the IR LED is optically coupled to the light pipe for transmission of the information at a second frequency, different from the first frequency, from the IR LED to the IR receiver.

18. The communication system of claim 11, wherein each data storage drive further comprises:
   an IR LED controller circuitry configured to operationally control, according to a repeating loop, a signal carrying the information from the IR LED.

19. The communication system of claim 18, wherein each data storage drive further comprises:
   a visible power on LED; and
   a visible LED controller circuitry configured to operationally control the power on LED with a steady state signal.

20. A communication system comprising:
   a plurality of data storage drives in the form of hard disk drives and/or solid-state drives and/or hybrid drives, data storage drive comprising:
      means for transmitting from the data storage drive an infrared (IR) carrier wave signal carrying a payload comprising serial number information that particularly identifies the data storage drive; and
   portable means for receiving the carrier wave signal from the data storage drive and respective carrier wave signals carrying payloads comprising serial number information that particularly identifies neighboring data storage drives.

* * * * *